Patented May 7, 1929.

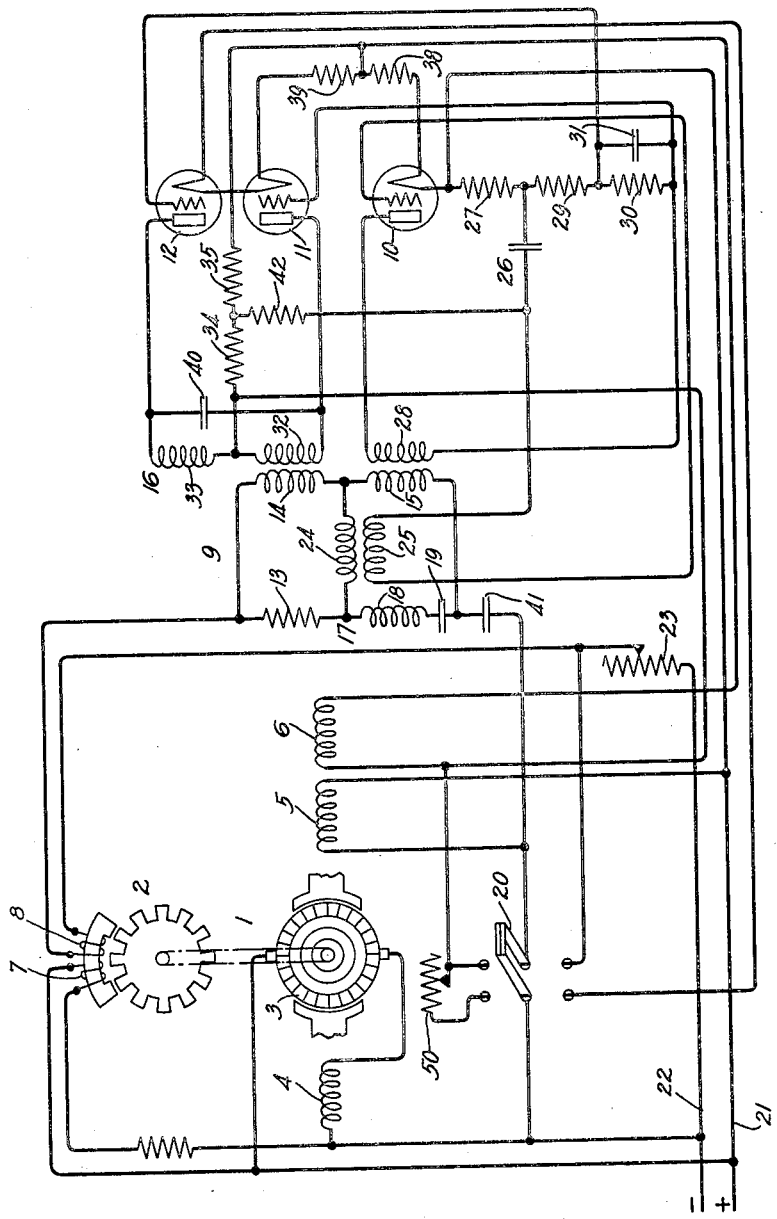

1,711,661

UNITED STATES PATENT OFFICE.

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK.

REGULATOR SYSTEM.

Application filed June 29, 1928. Serial No. 289,135.

This invention relates to control systems governed by electric space discharge devices and particularly to regulator systems for maintaining the speed of motors constant.

One object of the invention is to provide a regulator system operating in an improved manner under the control of a Wheatstone bridge circuit for maintaining the speed of a motor constant.

Another object of the invention is to provide a control system having amplifier tubes supplied with alternating space current that shall govern the amplifier tubes to obtain full wave rectification thereby in an improved manner.

A further object of the invention is to provide a regulator system having a detector tube therein that shall compensate the potential impressed on the grid of the tube according to the space current thereof for stabilizing the regulating action.

In the preferred embodiment of the invention, a speed regulator system is provided with means including electric space discharge devices under the control of a Wheatstone bridge circuit for maintaining the speed of a motor constant. A pilot generator is operated according to the motor speed for supplying to the bridge circuit an alternating current the frequency of which varies according to the motor speed. The Wheatstone bridge circuit has one arm in the form of a resonant circuit and has two opposite vertices thereof connected to the pilot generator. The other vertices of the bridge are connected to a detector tube. The resonant arm of the Wheatstone bridge circuit is tuned to the frequency of the current produced by the pilot generator when the motor is operating at normal speed to control the detector tube according to the motor speed. The detector tube is coupled to two amplifier tubes by means of two resistance elements and the output circuits of the amplifier tubes are connected to the regulating field winding of the motor. The connection of the amplifier tubes to the regulating field winding and the bridge circuit arrangement are very similar to that disclosed in the application of H. M. Stoller, Serial No. 200,459, filed June 21, 1927.

In the present invention the pilot generator supplies alternating space current to the detector and amplifier tubes. The input circuits of the two amplifier tubes are connected across coupling resistance elements in the detector output circuit and a capacity element is connected across one of the coupling resistance elements. The capacity element connected across one of the coupling resistance elements serves to change the phase relation of the potential impressed on one grid of the two amplifier tubes so that full wave rectification of the alternating space current supplied to the amplifier tubes may be effected.

A capacity element is connected from one of the coupling resistance elements between the detector and amplifier tubes to the grid circuit of the detector for compensating the potential impressed on the detector grid in accordance with the detector space current. This compensating means serves to stabilize the action of the regulator. The capacity element connected to the detector grid circuit is also connected to resistance elements in the output circuit of the amplifier tubes for providing a delayed feed-back in the manner disclosed and claimed in the patent to H. M. Stoller No. 1,662,085 dated March 13, 1928.

The single figure in the accompanying drawing is a diagrammatic view of a regulator system constructed in accordance with the invention.

Referring to the drawing a shunt wound motor 1 is directly connected to a pilot induction generator 2. The motor 1 comprises an armature 3, a series field-magnet winding 4, a shunt field-magnet winding 5, and a regulator field-magnet winding 6. The pilot induction generator 2 comprises a field-magnet winding 7 and an armature winding 8.

The excitation of the regulator field-magnet winding 6 is controlled by a Wheatstone bridge circuit 9, a detector tube 10 and two regulator tubes 11 and 12. The Wheatstone bridge circuit 9 comprises a resistance 13, two sections 14 and 15 of the primary of a power transformer 16, and a tuned circuit 17. The tuned circuit 17 comprises an inductance element 18 and a capacity element 19. The bridge circuit 9 and also the power transformer 16 are connected to the pilot generator 2 by means of a regulating switch 20. The regulator switch 20, which is shown as a two-pole double-throw switch, is closed in the lower position to operate the motor 1 as a regulated motor and is closed in the upper position to operate the motor 1 as a plain shunt motor. When the regulator switch 20 is closed in the lower position two opposite vertices of the Wheatstone bridge circuit 9 and also the primary winding of the power transformer 16 are connected to the armature of the induction generator 2. In the lower position of the regulator switch the shunt field-magnet winding 5 is connected across supply conductors 21 and 22 in series with a regulator resistance element 23. The regulator field-magnet winding 6 is supplied with current when the switch 20 is closed in the regulator position in a manner to be hereinafter set forth.

An output transformer comprising a primary winding 24 and a secondary winding 25 is connected to two vertices of the Wheatstone bridge circuit 9 opposite to the two vertices connected to the pilot generator 2. The secondary winding of the regulator transformer is connected to the input circuit of the detector tube 10 through a condenser 26 of about one microfarad capacity and a resistance element 27. A secondary winding 28 of the power transformer 16 supplies space current to the detector tube 10 through resistance elements 27, 29 and 30. The resistance elements 27, 29 and 30 serve to couple the regulator tubes 11 and 12 to the detector tube 10. The resistance element 30 is bridged by a condenser 31 which serves to control the grid potential on the tube 11 in a manner to effect full wave rectification by regulator tubes 11 and 12.

The regulator tubes 11 and 12 are respectively supplied with space current by secondary windings 32 and 33 of the power transformer 16. The output circuits of the regulator tubes 11 and 12 are connected in parallel to the regulating field-magnet winding 6 and the resistance elements 34 and 35. Consequently, the regulating field-magnet winding 6 is energized in accordance with the current in the output circuit of the regulator tubes 11 and 12.

Filament current for the detector and regulator tubes in the lower position of the regulator switch 20 is obtained by a circuit extending from the positive supply conductor 21 through the filament of the detector tube 10, resistance elements 38 and 39, filaments of the regulator tubes 11 and 12, and a switch arm of the regulator switch 20 to the negative supply conductor 22. A condenser 40 is connected across secondary windings 32 and 33 of the power transformer 16 in order to tune the complete circuit with the generator 2. A condenser 41 is connected in circuit with the armature 8 of the pilot generator 2 in order to improve the power factor of the generator current. A resistance element 42 in combination with the resistance elements 34 and 35 and the condenser 26 serves to effect a delayed feedback from the output circuits of the regulator tubes 11 and 12 to the detector tube 10 in the manner disclosed in the patent to H. M. Stoller 1,662,085, dated March 13, 1928, and patent to E. C. Manderfeld 1,662,071 dated March 13, 1928.

Assuming the regulator switch 20 is closed in the lower or regulated position, the motor 1 will first accelerate as an ordinary shunt wound motor. When the speed of the motor is low the voltage generated by the inductor generator 2 will be low and consequently the plate voltage supplied to the detector and regulator tubes will be low so that no current will flow through the regulator field-magnet winding 8. When the motor has reached approximately half speed the voltage produced by the pilot generator becomes sufficient to set the regulating circuits into action. The Wheatstone bridge circuit 9 with the motor operating at approximately half speed will be unbalanced due to the fact that the capacity reactance of the condenser 19 will exceed the inductive reactance of the inductance element 18 in the tuned circuit arm of the bridge. Accordingly the output transformer comprising windings 24 and 25 will impress a potential on the grid of the detector tube 10. Space current for the tube 10 will flow in the secondary winding 28 through the resistance elements 27, 29 and 30 and produce a voltage drop across the resistance elements 27, 29 and 30. The grid of the regulator tube 12 is connected to a point between the resistance elements 29 and 30 and accordingly has a potential impressed upon it corresponding to the drop across the resistance elements 27 and 29. The grid of the regulator tube 11 is connected to one terminal of the resistance element 30 and has a potential impressed upon it according to the discharge of the condenser 31. The potentials impressed on the grids of the regulator tubes 11 and 12 drive the grids negative and therefore suppress current flow through the regulator tubes. The lowering of the space current flow through the regulator tubes 11 and 12 weakens the current flow through the regulator field-magnet winding 6 and thus permits the motor to accelerate until an equilibrium speed is reached. Under normal conditions of line voltage and load the normal speed of the motor will be at the point of balance of the Wheatstone bridge circuit 9. Thus the pilot generator 2 which supplies current, the frequency of which varies according to the motor speed, will supply current, the frequency of which corresponds to the tuning of the tuned arm of the Wheatstone bridge, when a motor is operating at normal speed.

Assuming the motor 1 has accelerated to the balancing point of the Wheatstone bridge circuit the inductive reactance 18 balances the capacity reactance 19 and the impedance of the combination is matched by the resistance element 13 to give a balanced bridge. At this time no voltage is delivered by the output transformer to the grid of the detector tube 10. Consequently the current flow through the detector tube is lowered to reduce the voltage drop across the coupling resistance elements 27, 29 and 30. This reduces the negative potential impressed on the grids of the regulator tubes 11 and 12. Reducing the negative potential on the grids of the regulator tubes permits increased current to flow through the regulator field-magnet winding 6. The space current of the regulator tubes 11 and 12 is raised to increase the current flow through the regulator field-magnet winding 6. The space current path for the regulator tube 12 extends from the filament of the tube 12 through the filament of tube 11, resistance element 39, regulator winding 6 and resistance elements 34 and 35, in parallel, and the secondary winding 33 of the power transformer 16 to the plate of the tube 12. The space current path of the regulator tube 11 extends from the filament of the tube through the resistance element 39, regulator winding 6 and resistance elements 34 and 35 in parallel and the secondary 32 of the power transformer 16 to the plate of the regulator tube 11. Increasing the excitation of the regulator field-magnet winding 6 strengthens the field of the motor and prevents a further rise in speed.

If the line voltage is increased or the load on the motor is reduced the speed of the motor will tend to increase and unbalance the Wheatstone bridge circuit in an opposite direction. The inductive reaction of the inductance 18 will exceed the capacity reaction of the capacity 19. Since the bridge circuit output is now reversed in phase the grid of the detector tube 10 will go positive when the plate of the tube goes negative and vice versa. In this connection attention is called to the supply of plate current for the detector tube 10 and the regulator tubes 11 and 12 from the inductor generator 2 through the power transformer 16. Accordingly there will be a further reduction in the current flow through the detector tube 10 and a further reduction in the negative potential impressed on the grids of the regulator tubes 11 and 12 thereby increasing the space current flow through the regulator tubes and consequently increasing the current flow through the regulator field-magnet winding 6. This strengthens the motor field to prevent a further increase in the motor speed.

As hereinbefore set forth the negative potential impressed on the grid of the regulator tube 12 is controlled according to the voltage drop across the resistance elements 27 and 29 and the negative potential impressed on the grid of the regulator tube 11 is controlled in accordance with the discharge from the condenser 31 which is bridged across the resistance element 30. Inasmuch as the same supply of alternating current is connected to the detector tube and the two regulator tubes it is apparent that special provision must be made for controlling the potential impressed on the grids of the two regulator tubes if full wave rectification is to be effected. When the plate of the tube 12 is positive the plate of the tube 11 is negative and vice versa. Accordingly the potentials impressed on the grids of the two regulator tubes 11 and 12 must be opposite in sign. In order to impress a negative potential on the grid of the regulator tube 11 when the grid of the regulator tube 12 is positive the condenser 31 is connected across the resistance element 30. Thus, when the regulator tube 12 is rectifying one-half a wave, the condenser 31 is being charged and the discharge of this condenser impresses a potential on the grid of the regulator tube 11 to rectify the other half of the wave.

The condenser 26 combined with the resistance elements 34, 35 and 42, not only serves to effect a delayed feed-back on the grid of the detector tube 10 in the manner disclosed in the above mentioned patent to H. M. Stoller, but also cooperates with the resistance element 27 for stabilizing the operation of the detector tube and the regulator system. With the condenser 26 connected in the circuit as above described the resistance element 27 supplies a negative biasing potential for the detector grid which varies according to the current flow through the detector. Thus if there is a sudden increase in the plate current through the detector tube 10 the condenser 26 being of relatively large capacity causes the transient potential drop in the resistance element 27 to increase the negative potential on the grid of the detector tube. An opposite effect is produced upon a sudden reduction of the current flow through the detector tube.

The operation of the regulator system has been described, assuming the motor 1 to be started from rest and accelerated to normal speed. If the load on the motor is increased above normal or the line voltage is reduced below normal, the Wheatstone bridge circuit will be unbalanced to operate the detector tube 10 and increase the negative potential on the grids of the regulator tubes 11 and 12. This decreases the current flow through the regulator tubes 11 and 12 and accordingly reduces the current flow through the regulator field-magnet winding 6 to increase the speed of the motor.

If the regulator switch 20 is closed in the upper position the shunt field-magnet winding 5 is connected across the supply conductors 21 and 22 by a circuit which extends through the resistance element 50. The regulator field-magnet winding 6 is also connected across the supply conductors 21 and 22 to operate as a shunt winding. The circuit through the regulator field-magnet winding 6 is traced from the negative supply conductor 22 through a switch arm of the regulator switch 20, resistance element 50, regulator field-magnet winding 6, resistance element 38 and the filament of the detector tube 10 to the other supply conductor 21. The speed of the motor when the regulator switch 20 is in the shunt operating position may be controlled by varying the resistance elements included in circuit with the shunt windings.

Modifications in the regulator system and in the arrangement and the location of parts may be made within the spirit and scope of the invention and such modifications are intended to be covered by the appended claims.

What is claimed is:

1. In a control system, a detector tube, two three-element rectifier-amplifier tubes controlled by said detector tube, a source of alternating current for supplying space current in the same phase relation to the detector and amplifier tubes, and means for coupling said amplifier tubes to the detector tube to operate the amplifier tubes and obtain full wave rectification.

2. In a regulator system for a dynamo electric machine, a detector tube operated in accordance with a characteristic of said machine, means comprising two three-element rectifier-amplifier tubes governed by said detector tube for controlling the machine characteristic, a source of alternating current for supplying space current to the detector and amplifier tubes, and resistance means for coupling said amplifier tubes to the detector tube to operate the amplifier tubes and obtain full wave rectification.

3. In a speed regulator system for a motor, a source of alternating current having a frequency varying according to the motor speed, a detector tube supplied with space current from said source, a Wheatstone bridge circuit connected to said source of current for controlling the detector tube in accordance with the motor speed, two three-element rectifier-amplifier tubes supplied with alternating space current by said source, means for coupling said amplifier tubes to the detector tube to operate the amplifier tubes and obtain full wave rectification, and means controlled by the amplifier tubes for maintaining the motor speed constant.

4. In a regulator system for a dynamo electric machine, a detector tube operated in accordance with a characteristic of said machine, coupling resistance elements in the output circuit of said detector tube, a capacity element connected across one of said resistance elements, two three-element amplifier tubes controlled by said detector tube, means for supplying alternating current space current in the same phase relation to said detector and amplifier tubes, means for connecting the input circuits of said amplifier tubes across the coupling resistance for effecting full wave rectification in accordance with the machine characteristic, and means controlled by the amplifier tubes for maintaining said machine characteristic constant.

5. In a speed regulator system for a motor, a generator operated in accordance with the motor speed, a Wheatstone bridge circuit having one arm thereof in the form of a resonant circuit, two opposite vertices of said bridge circuit being connected to said generator, a detector tube connected to the other vertices of said bridge circuit, coupling resistance elements in the output circuit of said detector tubes, a capacity element connected across one of said resistance elements, two three-element thermionic amplifier tubes controlled by said detector tube, the input circuits of said amplifier tubes being respectively connected across said coupling resistance elements, means for supplying space current to said amplifier tubes from said generator, and a regulating field winding for said motor connected to said amplifier tubes.

6. In a regulator system for a dynamo electric machine, means for operating a three-element detector tube in accordance with a characteristic of said machine, coupling resistance elements in the output circuit of said detector tube, a capacity element connected between said coupling resistance elements and the grid circuit for controlling the detector grid potential according to variation in the space current, and means coupled to said detector tube for maintaining the motor characteristic constant.

7. In a speed regulator system for a motor, a source of alternating current having a frequency varying according to the motor speed, a three-element detector tube, a Wheatstone bridge circuit connected to said source for operating the detector tube according to the motor speed, a thermionic amplifier tube, coupling resistance elements for connecting said detector tube to the amplifier tube, and a capacity element connected to a mid-point of said coupling resistance elements and the grid circuit of the detector tube for controlling the detector grid potential according to the detector space current, and a regulating field winding controlled by the amplifier tube for maintaining the motor speed constant.

8. In a speed regulator system for a motor, means for operating a three-element detector tube according to the motor speed, a thermionic amplifier tube controlled by said detector tube, a coupling resistance element for connecting the detector tube to the amplifier tube, a capacity element connected between said coupling resistance and the grid circuit of the detector tube for controlling the detector grid potential according to variations in the detector space current, and means controlled by the amplifier tube for maintaining the motor speed constant.

9. In a speed regulator system for a motor, a generator operated in accordance with the motor speed, a Wheatstone bridge circuit having one arm in the form of a resonant circuit, two opposite vertices of said bridge circuit being connected to said generator, a detector tube connected to the other vertices of said bridge circuit, an amplifier tube controlled by said detector tube, coupling resistance elements for connecting said amplifier tube to the detector tube, and a capacity element connected between a point on said coupling resistance elements and the grid circuit of the detector tube for compensating the potential on the grid of the detector tube according to variations in plate current of the detector tube, and means controlled by the amplifier tube for maintaining the motor speed constant.

10. In a speed regulator system for a motor, a generator operated in accordance with the motor speed, a Wheatstone bridge circuit having one arm in the form of a resonant circuit, two opposite vertices of said bridge circuit being connected to said generator, a detector tube connected to the other vertices of said bridge circuit, an amplifier tube controlled by said detector tube, a coupling resistance for connecting the input circuit of the amplifier tube to the detector tube, a capacity element connected to said coupling resistance and to the grid circuit of said detector tube for compensating the potential on the detector grid according to the space current of the detector tube, means including said capacity element and resistance element connected to the output circuit of said amplifier tube for effecting a delayed feed-back to the detector grid to stabilize the regulating action, and a regulating field winding controlled by the amplifier tube to maintain the motor speed constant.

In witness whereof, I hereunto subscribe my name this 27th day of June, 1928.

HUGH M. STOLLER.